United States Patent [19]

Anstee et al.

[11] 4,246,743
[45] Jan. 27, 1981

[54] FULL BALE ALARM SYSTEM

[75] Inventors: L. Lavern Anstee, Leola; Aquila D. Mast, Lancaster, both of Pa.

[73] Assignee: Sperry Corporation, New Holland, Pa.

[21] Appl. No.: 62,666

[22] Filed: Aug. 1, 1979

[51] Int. Cl.³ .............................................. A01D 87/00
[52] U.S. Cl. ................................... 56/341; 100/88; 100/99
[58] Field of Search ............... 56/10.2, DIG. 15, 341; 100/99, 88, 89

[56] References Cited

U.S. PATENT DOCUMENTS

| | | | |
|---|---|---|---|
| 3,368,214 | 2/1968 | Swanson | 56/DIG. 15 |
| 3,626,402 | 12/1971 | Price | 56/DIG. 15 |
| 4,026,205 | 5/1977 | Blanshine et al. | 56/341 |
| 4,068,223 | 1/1978 | Steffen | 56/10.2 |
| 4,167,844 | 9/1979 | Freimuth | 56/343 |

OTHER PUBLICATIONS

Sperry New Holland Advertising Brochure–Round Baling Systems, pp. 4–5 Fig. 9, ©1979,–5-79 IPC.

*Primary Examiner*—Paul J. Hirsch
*Attorney, Agent, or Firm*—Frank A. Seemar; Larry W. Miller; James R. Bell

[57] ABSTRACT

In a roll forming machine adapted to be towed across a field behind a prime moving vehicle controlled by an operator in a cab there is provided a full bale alarm system that signals the operator through a remote indicator that the bale has reached a predetermined desired size and is ready for discharge.

9 Claims, 3 Drawing Figures

U.S. Patent            Jan. 27, 1981            4,246,743
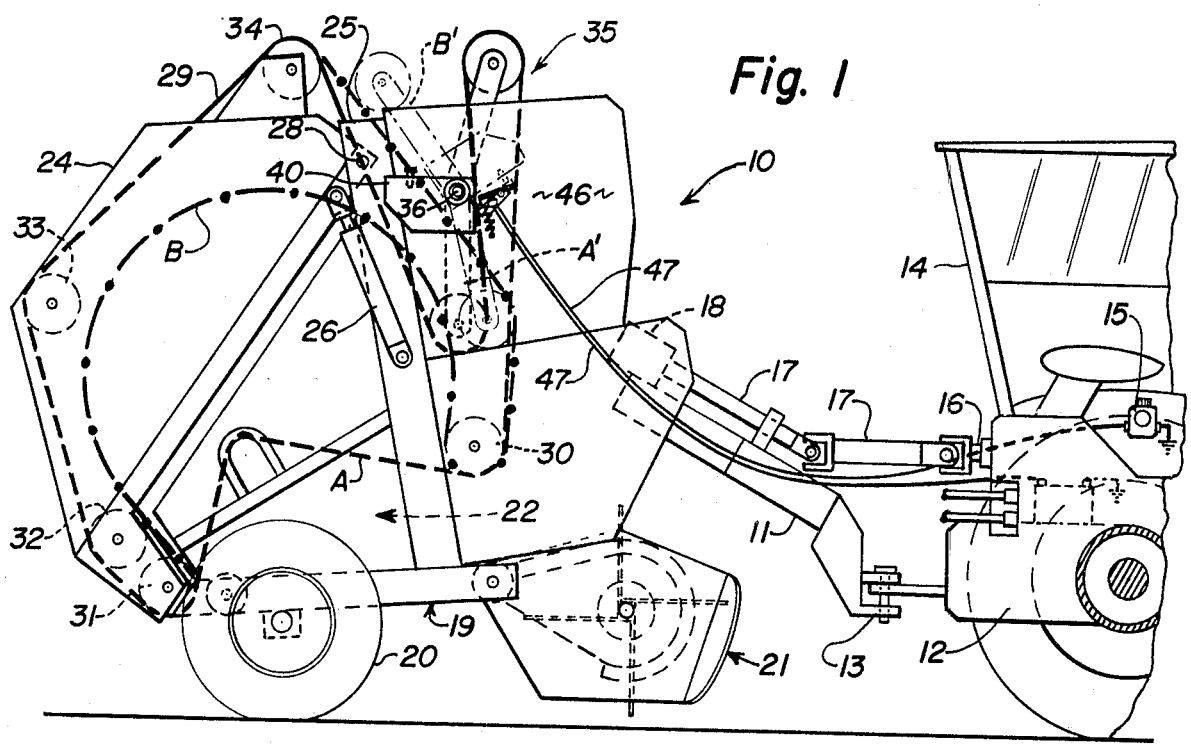

FULL BALE ALARM SYSTEM

BACKGROUND OF THE INVENTION

This invention relates to a machine for forming large cylindrical bales of crop material, commonly called round bales, in a roll forming region. More specifically, it is concerned with apparatus which permits the machine operator working from a cab within the towing vehicle, to receive a signal that tells when the crop roll has reached a predetermined size and is ready for discharge.

Historically, it has been the custom to harvest forage crops by mowing the particular crop, letting it dry in the field, forming the dried crop material into windows and passing a hay-baling machine over and along these windrows to form the crop material into rectangular bales. Recent practice has shown that the formation of crop material into large compact rolls, rather than rectangular bales as formerly done, permits the crop material to be deposited in roll form and left in fields for extended periods of time. The ability to leave these rolled bales in fields obviates the additional steps required in the transitional rectangular baling process of gathering the bales and transporting them to a storage area protected from the elements. This new technique of forming large round bales has created a baling system that can be conducted by one person. This is in marked constrast to the traditional practice of forming rectangular bales where the labor of several people was required to effect the cutting, drying, windrowing, baling, gathering and storing of the crop material.

Several methods of forming compact cylindrical rolls of crop material have evolved through the years. The most successful of these methods involves the forming of crop rolls by picking up a swath or windrow of material from the field and directing it onto a lower conveyor. This conveyor transports the material to a a roll or bale forming region where an upper apron or flight of belts, usually positioned above and adjacent the conveyor, moves in a suitable direction to rotate the crop material with which it is brought into contact. The increasing popularity of these crop roll forming machines has seen their use broaden from rolling wintering forage for livestock to rolling high protein crops, such as alfalfa, for dairy livestock. Therefore, these machines are the focal point of many ideas for developing both labor-saving and time-saving apparatus.

Regardless of whether the crop roll is formed above the ground on a conveyor or is formed by rolling along th ground, all prior crop roll forming machines require the operator, who is located in the operator's area of a prime moving vehicle, such as a tractor, to continually monitor the size of the crop roll being formed within the roll forming region of the machine. This monitoring process entails the operator viewing rearwardly over his shoulder the roll forming machine, as well as observing to the front of the prime moving vehicle to ensure that the path of travel that is negotiated is along a preformed windrow of crop material. This is obviously a difficult and tiring procedure, especially when it is realized that the round bale forming operation for large farms can take as long as 8 to 10 hours a day. There is an additional compelling reason for the continual monitoring of the size of the bale within the roll forming machine, since an oversized bale can damage the bale forming means or upper apron which envelopes the expanding roll of crop material. Should the amount of crop material fed into the roll forming region exceed the capacity of the baler, the bale forming means could be permanently damaged and ejection of the bale utilizing the normal procedures may be difficult or virtually impossible.

Prior roll forming machines use some sort of a visual or audio indicator mounted on the crop roll forming machine to indicate when the bale is full-sized. There are several inherent disadvantages to either of these approaches. The visual indicator method still requires the operator to look rearwardly over his shoulder during the bale forming operation at what typically is a needle on a calibrated scale that moves as the bale expands toward the full size. The operator, utilizing this type of a system, must still continue to perform the difficult task of controlling the forward movement of the tractor and the towed roll forming machine along its desired path of travel while monitoring the growth of the bale to his rear. Should the operator be preoccupied with negotiating a particularly difficult stretch of terrain with the tractor and the roll forming machine, it is a relatively easy matter to inadvertently overfill the roll forming chamber. Thus, this type of a bale size monitoring system suffers both from requiring the operator to look rearwardly while the tractor and roll forming machine move forwardly across a field and from having a full size indicator that could go unobserved by the operator during the most critical portion of the bale forming process.

The audial alarm for full bale size system used by some commercial manufacturers employs a bell or noise making apparatus on the roll forming machine itself. When the bale is full sized, a mechanical linkage causes the bell or noise making apparatus to sound as a warning to the operator to stop the baling process. This system suffers from the principal disadvantage of having the alarm signal often be drowned out by the combined noise of the towing tractor and the operation of the roll forming machine. This combined noise level of the tractor and the roll forming machine in essence causes the operator to continue to monitor thesize of the bale by observing to the rear during the baling process to determine when the bale is full sized. Additionally, the widespread use of cabs that are well sealed accoustically to minimize the noise levels reaching the operators make it impractical to use audial signals that originate outside the cabs of the modern tractors of today.

The foregoing problems are solved in the design of the machine comprising the present invention by providing a full bale alarm system that automatically signals the operator of the roll forming machine through a remote indicator that the bale is fully sized and ready for discharge.

SUMMARY OF THE INVENTION

It is an object of the present invention to provide in a crop roll forming machine a full bale alarm system that will signal the operator when the bale within the roll forming region is full sized and ready for discharge.

It is a feature of the present invention that a sensor is incorporated within the bale forming means or upper apron takeup mechanism which automatically actuates the full bale alarm system to tell the operator when the bale has reached the full size.

It is another feature of this invention that there is a remote indicator mounted within the cab of the towing vehicle or tractor which receives a signal from the sensor and both audially and visually will indicate to the operator that the bale is full size.

It is an advantage of the present invention that the full bale alarm system will signal the operator when the bale is fully formed and thereby prevent damage occurring to the upper apron or bale forming means.

It is another advantage of this invention that the need for the operator to depend entirely on his own rearward observation of the bale size to determine when to stop or terminate the baling operation is eliminated.

It is a further advantage of the instant invention that the opportunity of forming a oversized bale within the bale forming region which is difficult to discharge via the normal discharge procedures is greatly reduced or eliminated.

These and other objects and advantages are obtained by providing in a crop roll forming machine adapted to be towed across a field by a towing vehicle, such as a tractor, a full bale alarm system that signals the operator in the operator's area through a remote indicator that the bale has reached a predetermined size and is ready for discharge.

BRIEF DESCRIPTION OF THE DRAWINGS

The advantages of this invention will become apparent upon consideration of the following detailed disclosure of the invention, especially when it is taken in conjunction with the drawings wherein:

FIG. 1 is a side elevational view of a crop roll forming machine attached to a partially illustrated tractor for towing across the field showing the sensing means mounted to the side of the frame and the operation and positioning of the bale forming means take up in the full bale size position and in the position for initiating the formation of a bale;

FIG. 2 is an enlarged side elevational view of the sensing means mounted to the side of the roll forming machine and showning in phantom lines the cooperative interaction of the takeup means with the sensing means when the bale is fully formed; and FIG. 3 is a top plan view taken along the line 3—3 of FIG. 2.

DETAILED DESCRIPTION OF THE PREFERRED EMBODIMENT

The roll forming machine is indicated generally by the numeral 10 in FIG. 1. It is seen that the machine is connected via a draft member 11 to the tractor 12 via hitch 13. The tractor 12 has a cab 14 within which is mounted within clear view of the operator a full bale alarm box 15 which emits both an audial and visual signal upon the achieving of a full sized bale within the roll forming machine, as will be described hereinafter. Rotary power is transferred from the power takeoff 16 of the tractor 12 via a series of interconnected power takeoff shafts 17 to the gearbox 18 of the roll forming machine 10. The rotary power is transferred through the gearbox 18 via drive belts, sheaves, drive chains and sprockets to the mechanically operational components of the roll forming machine.

The roll forming machine 10 has a frame indicated generally by the numeral 19 which is mounted to a pair of wheels 20, only one of which is shown in FIG. 1. The frame 19 at its forward portion has a pickup, indicated generally by the numeral 21, which gathers crop material from precut and preformed windrows of crop material and directs it upwardly into a roll forming region indicated generally by the numeral 22. The upper and rearward portion of the frame 19 has a tailgate 24 which is pivotally affixed to the top of a generally upright beam 25. The tailgate 24 is raised and lowered by means of a pair of hydraulic cylinders 26, only one of which is shown, which serve to cause the tailgate to pivot about pivot point 28.

The upper or bale forming means 29 is rotatably mounted about a drive sprocket 30 and a series of idlers 31,32,33,34. A takeup mechanism or serpentine indicated generally by the numeral 35 is rotatably mounted to the frame via a shaft 36, best seen in FIG. 2. The serpentine 35 consists of a pair of individual arms 38,39 mounted to the rotatable shaft 36 on opposing sides of the frame. Fixedly fastened to arm 39 is a cam plate 40 which rotates in a clockwise direction as the bale expands in the upper apron 29 is played out about expanding crop roll. This pivotal movement of the serpentine arms and, specifically, cam plate 40, is shown in enlarged detail in FIG. 2. FIG. 1 shows the relative positioning of the lower portion of the upper apron 29 as letter A when a bale of crop material is initially being formed and as the letter B when the upper apron has expanded to surround a nearly full sized crop roll. The positioning of the serpentine arm 39 corresponding to the positioning of the lower course of the upper apron in positions A and B is illustrated as A' and B', respectively in FIG. 1.

The details of the roll forming machine 10 are not described in further detail at this point because they are old and well known to one of ordinary skill in the art. The details of the machine 10 are shown and described in U.S. Pat. No. 3,848,526 to Mast, issued Nov. 19, 1974, hereinafter specifically incorporated by reference in relative portions insofar as is consistent with the instant disclosure. Further, the details of the upper apron takeup or serpentine 35 are not described in further detail at this point because they too are old and well known to one of ordinary skill in the art. The serpentine is described and illustrated in greater detail in U.S. Pat. No. 4,026,205, issued May 31, 1977, to Blanshine et al, hereinafter specifically incorporated by reference in pertinent part insofar as it is consistent with the instant disclosure.

Returning to FIG. 2, it is seen that the cam plate 40 has mounted thereto via a bracket 41 an adjustably extensible bolt 42. Bracket 41 as seen in FIG. 3 is appropriately fastened to cam plate 40, such as by bolts, and may be laterally adjustable. A normally closed electrical switch 44 is mounted to a bracket 45 that is affixed to a side sheet 46 which is in turn securely fastened to the frame 19. Switch 44 may be securely fastened to bracket 45 by an intermediate mounting plate (not shown) which is welded to bracket 45. Switch 44 has a plunger 48 which is engaged by a pivotable plate 49 that holds the plunger 48 in, keeping the electrical circuit open. Plate 49 is fixedly fastened to rotatable member 50 so that it pivots with it. Plate 49 is biased via spring 51, suitably fastened to side sheet 46, so that it normally remains in contact with the plunger keeping the switch 44 open.

Although not shown in detail, the indicator alarm box 15 with its signal light and buzzer is easily assembled from commercially available components by one of ordinary skill in the art. Typically, the buzzer is 12 volt and can be procured from Edwards Co. Inc., a unit of General Signal, as Model No. 122-F1. Similarly, the red light is a standard type of taillight, such as the type produced by K. D. Lamp Co. of Cincinnati, Ohio as part number 500-0-6-273. The alarm box 15 also uses 2 wiring harnesses, one connecting the switch 44 to the tractor electrical power source with an appropriate adaptor and the other connecting the switch 44 to the alarm box. These wiring harnesses are readily available commercially, such as from London Harness and Cable Corporation in Philadelphia, Pa. Other standard components used include a circuit breaker and appropriate number of seals, electrical connector plugs, bolts, washers and mounting nuts and brackets.

In operation, the roll forming machine 10 moves across a field behind a towing tractor 12 collecting crop material from a preformed, precutted windrow. The crop material is directed into the roll forming region 22 where the bale forming means or upper apron 29 rolls the crop material into an ever expanding cylindrical roll or round bale. As the upper apron 29 is played out about the periphery of the crop roll in response to the pivotal movement of the serpentine 35, the serpentine arms 38 and 39 rotate in a clockwise direction. When the crop roll has achieved a predetermined desired size the cam plate 40 moves with the serpentine arm 39 from position B to position B', best shown in FIG. 2. This causes the adjustably extensible bolt 42 to engage pivotal plate 49 on the end opposing switch 44. Plate 49 is caused to pivot in a clockwise direction and is lifted on its opposing end from contact with plunger 48. Plunger 48 in switch 44 is springloaded so that it moves outwardly from the switch and thereby internally completes the circuit to permit a signal to be transferred via wires 47 from the tractor power source through the switch 44 back to the full bale alarm indicator box 15 in the cab of the tractor. The indicator alarm box 15 signals the operator with an audial buzzing sound, as well as a continuously lit red light, thus telling the operator that the bale has reached its fully formed size and the baling operation should be terminated until the bale is ejected from the roll forming machine 10.

While the preferred structure in which the principles of the present invention have been incorporated is shown and described above, it is to be understood that the invention is not to be limited to the particular details thus presented but, in fact, widely different means may be employed in the practice of the broader aspects of this invention. The scope of the appended claims is intended to encompass all obvious changes in the details, materials and arrangements of parts that will occur to one of ordinary skill in the art upon a reading of this disclosure.

Having thus described the invention, what is claimed is:

1. In a roll forming machine adapted to be towed across a field behind a prime moving vehicle controlled by a vehicle operator in a cab comprising:
   (a) a mobile frame having opposing sides;
   (b) a pickup mounted to the frame for gathering crop material from the field;
   (c) delivery means movably mounted to the frame adjacent the pickup to receive the crop material from the pickup;
   (d) bale forming means movably mounted to the frame adjacent the pickup and the delivery means so that crop material brought into contact with the bale forming means is imparted with a rotative motion:
   (e) a bale forming region on the frame generally defined by the bale forming means and the delivery means;
   (f) takeup means movably mounted to the frame to control the playing out of the bale forming means about the crop material as it expands circumferentially in size and is formed into a roll;
   (g) an electrical power source connectable to the machine;
   (h) an electrical switch attached to the frame and connectable to the electrical power source cooperative with the takeup means so that when the takeup means moves to a predetermined position relative to the frame in response to the expansion of the roll to a predetermined size the takeup means contacts the electrical switch; and
   (i) indicator means remotely mounted from the frame and connectable to the power source and the electrical switch to indicate to the operator in response to the takeup means contacting the electrical switch to complete the circuit between the power source and the indicator means when the roll has reached the predetermined size.

2. The roll forming machine according to claim 1 wherein the indicator means is mounted within the cab of the prime moving vehicle.

3. The roll forming machine according to claim 2 wherein the indicator means further comprises an audial alarm device actuatable in response to the actuation of the sensing means.

4. The roll forming machine according to claim 3 wherein the indicator means further comprises a visual signal actuatable in response to the actuation of the sensing means.

5. The roll forming machine according to claim 4 wherein the electrical switch further comprises a normally closed electrical switch.

6. The roll forming machine according to claim 5 wherein the takeup means comprises a pair of arms in fixed predetermined angular relationship in opposing sides of the frame fastened to a rotatable shaft, the shaft having at least one cam means attached thereto and rotatable therewith so that when the arms are rotated about the shaft to the predetermined position, the cam means contacts the electrical switch.

7. The roll forming machine according to claim 6 wherein the cam means further comprises an adjustably extensible member to selectively adjust the predetermined position.

8. The roll forming machine according to claim 7 wherein the adjustably extensible member further comprises a threaded bolt which can be selectively turned to control the length it extends from the cam means and therefor the point at which it engages the electrical switch.

9. In a roll forming machine adapted to be towed by a prime moving vehicle across a field having a bale forming means movably mounted to the frame which expandably envelopes a roll of crop material, a takeup means to control the playing out of the bale forming means as the roll expands, the improvement comprising:
   a full bale alarm system having an electrical switch attached to the frame and cooperative with the takeup means to send a signal to indicator means remotely mounted to the prime moving vehicle to indicate in response to the takeup means having moved to a predetermined position which causes takeup means to contact the electrical switch when the roll has expanded to a predetermined size and is ready to be discharged from the machine.

* * * * *